United States Patent
Matsunaga et al.

(10) Patent No.: US 8,165,831 B2
(45) Date of Patent: Apr. 24, 2012

(54) WATER LEVEL MEASURING APPARATUS AND MEASURING METHOD

(75) Inventors: Hideki Matsunaga, Saitama (JP); Shinji Kumazawa, Aichi (JP); Masayuki Motomura, Aichi (JP); Katsunori Yazawa, Aichi (JP)

(73) Assignees: UD Trucks Corporation, Ageo-shi (JP); NGK Spark Plug Co., Ltd., Nagoya-shi (JP)

( * ) Notice: Subject to any disclaimer, the term of this patent is extended or adjusted under 35 U.S.C. 154(b) by 263 days.

(21) Appl. No.: 12/411,825

(22) Filed: Mar. 26, 2009

(65) Prior Publication Data

US 2010/0076702 A1   Mar. 25, 2010

Related U.S. Application Data

(63) Continuation of application No. PCT/JP2007/067600, filed on Sep. 10, 2007.

(30) Foreign Application Priority Data

Sep. 26, 2006   (JP) .................................. 2006-260055

(51) Int. Cl.
*G01F 17/00* (2006.01)
(52) U.S. Cl. ........................................................ 702/55
(58) Field of Classification Search ...................... 702/55
See application file for complete search history.

(56) References Cited

U.S. PATENT DOCUMENTS 4,912,646 A * 3/1990 Cerruti ............................ 702/55
5,394,344 A * 2/1995 Lippmann et al. ............... 702/50

FOREIGN PATENT DOCUMENTS

| JP | H041992-285820 | 10/1992 |
| JP | H101998-245016 | 9/1998 |
| JP | H111999-311561 | 11/1999 |
| JP | 2004203156 A | 7/2004 |
| JP | 2006-170927 | 6/2006 |

OTHER PUBLICATIONS

Chinese Office Action for related CN Application No. 200780035677.7, dated Apr. 8, 2010 (English Translation Provided).
Japanese Office Action dated Mar. 6, 2012 in related JP Application No. 2006-260055.

* cited by examiner

*Primary Examiner* — Aditya Bhat
(74) *Attorney, Agent, or Firm* — Baker & Hostetler LLP

(57) ABSTRACT

A water level measuring apparatus and a water level measuring method, in which a water level $L_0$ of a liquid is read from a water level indicator secured to a liquid tank, and a filter value FLT is calculated by applying a filter with a time constant greater than one second to the water level $L_0$, and the filter value FLT is output as a final water level L. Accordingly, even if the surface sloshes and the water level $L_0$ fluctuates up and down, the water level $L_0$ is smoothed by the filter. Hence there is little influence of the liquid sloshing, and the water level measurement accuracy can be improved.

2 Claims, 5 Drawing Sheets

WATER LEVEL MEASURING APPARATUS AND MEASURING METHOD

CROSS-REFERENCE TO RELATED APPLICATIONS

This application is a continuation of PCT/JP2007/067600, filed on Sep. 10, 2007, and entitled "Water Level Measuring Device and Water Level Measuring Method," which claims priority to Japanese Patent Application No. 2006-260055, filed on Sep. 26, 2006, the disclosures of which are incorporated herein by reference in their entirety.

FIELD OF THE INVENTION

The present invention relates to a technique for measuring a water level highly accurately, even if sloshing occurs in a liquid stored in a liquid tank.

BACKGROUND OF THE INVENTION

As a water level measuring apparatus that measures the water level of a liquid stored in a liquid tank, there has been proposed a technique for indirectly measuring the water level based on a change in an interelectrode capacitance of a pair of electrodes arranged with a predetermined gap therebetween, as disclosed in Japanese Laid-Open (Kokai) Patent Application Publication No. H11(1999)-311561. Moreover, as a water level measuring apparatus that measures the water level by using another principle, there has been proposed a technique for directly measuring the water level based on a position of a float floating on a water surface, as disclosed in Japanese Laid-Open (Kokai) Patent Application Publication No. 2006-170927.

However, in the conventionally proposed water level measuring apparatus, when the surface is stable, the water level can be accurately measured, but when the surface is sloshing, the water level fluctuates up and down, and it is very difficult to determine which fluctuating value should be adopted as the water level. Particularly, when the water level of a liquid such as fuel carried in a moving vehicle is to be measured, multi-directional acceleration acts on the liquid so that the surface sloshes irregularly, and hence this undesirable situation may appear noticeably.

SUMMARY OF THE INVENTION

Therefore, in view of the conventional problem described above, it is an object of the present invention to provide a water level measuring apparatus and a water level measuring method (hereinafter, referred to as a "water level measuring technique"), in which a filter with a time constant greater than one second is applied to a water level measured by a water level indicator to thereby smooth the fluctuation of the obtained water levels due to the sloshing of the surface, so that there is little influence of the liquid sloshing.

Therefore the water level measuring technique of the present invention is characterized in that, an electronic circuit, a computer, or a control unit having the computer built therein applies a filter with a time constant greater than one second to a water level signal from a water level indicator that measures a water level of a liquid stored in a liquid tank, and outputs a water level signal to which the filter has been applied.

According to the water level measuring technique of the present invention, a filter value obtained by applying a filter with a time constant greater than one second to a water level measured by the water level indicator, is output as a final water level. Therefore, even if the surface sloshes so that the measured water level fluctuates, the water level is smoothed by the filter. Hence there is little influence of the liquid sloshing, and the water level measurement accuracy can be improved.

As used herein, the term "water level" is broadly defined to encompass the level of liquid such as liquid stored in a liquid tank.

DETAILED DESCRIPTION

Hereunder is a detailed description of the present invention, with reference to the drawings.

Figure 1:
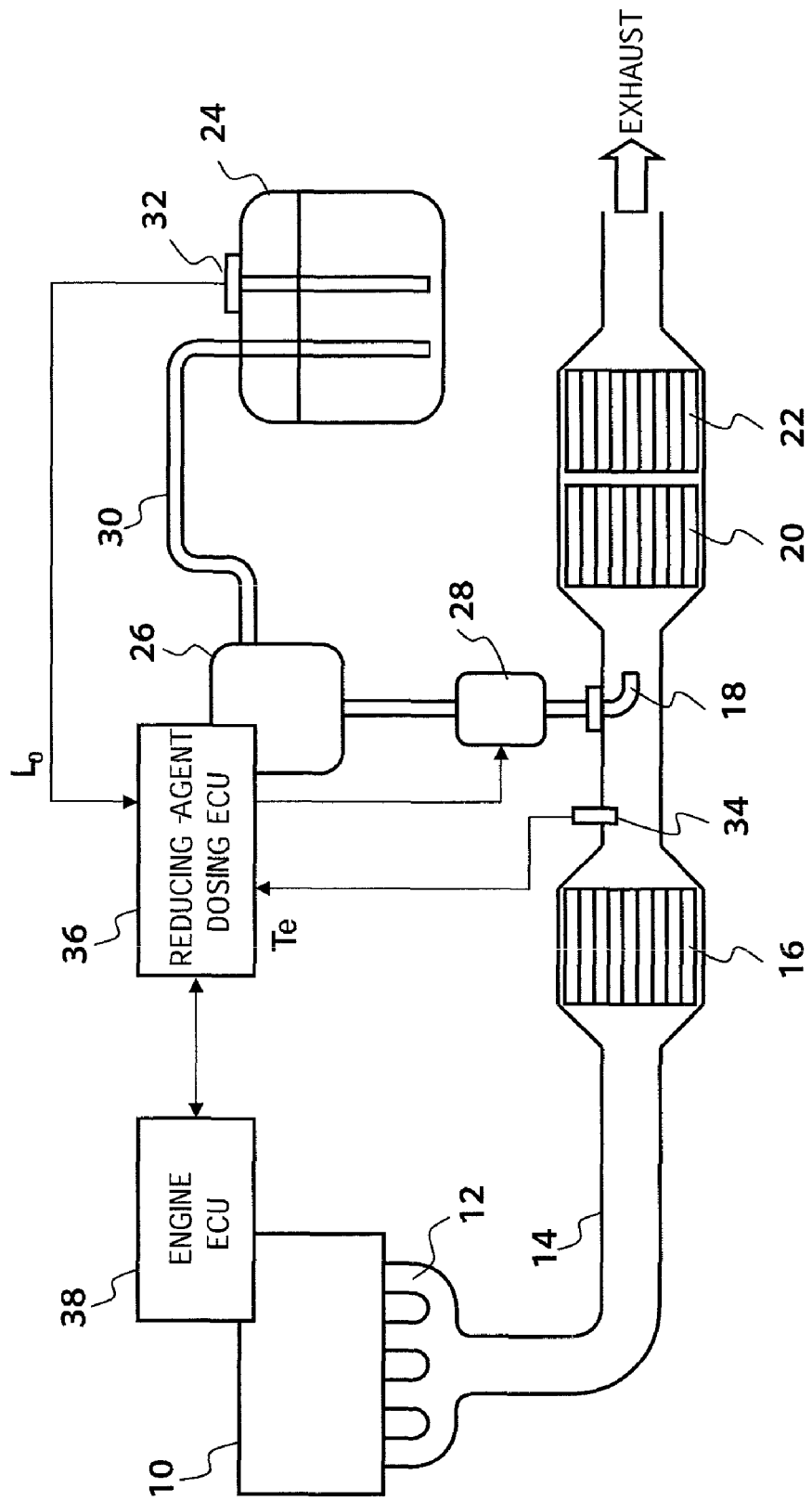
FIG. 1 is an overall configuration view of an exhaust emission purifying device to which the present invention is applied.

FIG. 1 shows an overall configuration of an exhaust emission purifying device to which the present invention is applied.

In an exhaust pipe 14 connected to an exhaust manifold 12 of an engine 10, there are respectively arranged along an exhaust emission flow direction in this order; a nitrogen oxidation catalyst 16 for oxidizing nitrogen monoxide (NO) to nitrogen dioxide (NO2), an injection nozzle 18 for injecting and supplying an urea aqueous solution as a precursor of a reducing agent, a NOx reducing catalyst 20 for reducing and purifying nitrogen oxide (NOx) by using ammonium obtained by hydrolyzing the urea aqueous solution, and an ammonium oxidation catalyst 22 for oxidizing the ammonium that has passed through the NOx reducing catalyst 20.

Urea aqueous solution stored in a reducing agent tank 24 (liquid tank) is supplied to the injection nozzle 18 via a supply pipe 30 having a suction port opened at a bottom of the reducing agent tank 24. Further, on the supply pipe 30, there are installed a pump module 26 for sucking and force feeding the urea aqueous solution, and a dosing module 28 having a flow control valve built therein for controlling an injection flow rate (supply flow rate) of the urea aqueous solution. Moreover a water level indicator 32 for measuring the water level L0 of the urea aqueous solution is secured to the reducing agent tank 24. For the water level indicator 32, an internal electrode and an external electrode having an annular cross-section are suspended concentrically from a ceiling wall toward a bottom wall of the reducing agent tank 24, and the water level indicator 32 indirectly measures the water level L0 based on a change in the interelectrode capacitance of the both electrodes. Incidentally, the water level indicator 32 is not limited to one for measuring the water level L0 based on the capacitance, and for example, various known water level indicators such as a floating type and an optical type can be used.

On the other hand, an exhaust temperature sensor 34 for measuring exhaust temperature Te is positioned in the exhaust pipe 14 between the nitrogen oxidation catalyst 16 and the injection nozzle 18. Respective output signals from the water level indicator 32 and the exhaust temperature sensor 34 are input to a reducing-agent dosing control unit (hereinafter referred to as a "reducing-agent dosing ECU") 36 having a computer built therein. Moreover engine operating conditions such as the engine rotating speed and the load of the engine are input from an engine control unit (hereinafter referred to as an "engine ECU") 38 that performs various controls of the engine 10, to the reducing-agent dosing ECU 36 via a network such as a controller area network (CAN). Furthermore the reducing-agent dosing ECU 36 executes a control program stored in a read only memory (ROM) or the like, to electronically control the pump module 26 and the dosing module 28, and realize various functions for measuring the water level L of the urea aqueous solution, respectively. At this time, the reducing-agent dosing ECU 36 calculates a control value representing the injection flow rate of the urea aqueous solution, based on the engine operating conditions including the exhaust temperature Te, for each predetermined time period.

In such an exhaust emission purifying device, the urea aqueous solution injected and supplied from the injection nozzle 18 according to the engine operating conditions, is hydrolyzed by exhaust heat and water vapor in the exhaust, and converted to ammonium. It is known that the converted ammonium causes a reduction reaction with the NOx in the exhaust in the NOx reducing catalyst 20, and is then converted to water (H2O) and nitrogen (N2). At this time, the NO is oxidized to NO2 by the nitrogen oxidation catalyst 16 in order to increase the NOx purifying capability of the NOx reducing catalyst 20, and a ratio between NO and NO2 in the exhaust is improved to a ratio suitable for the reduction reaction. On the other hand, the ammonium that has passed through the NOx reducing catalyst 20 is oxidized by the ammonium oxidation catalyst 22 arranged on the exhaust emission stream downstream of the NOx reducing catalyst 20, thereby preventing the ammonium from being directly discharged into the air.

Figure 2:
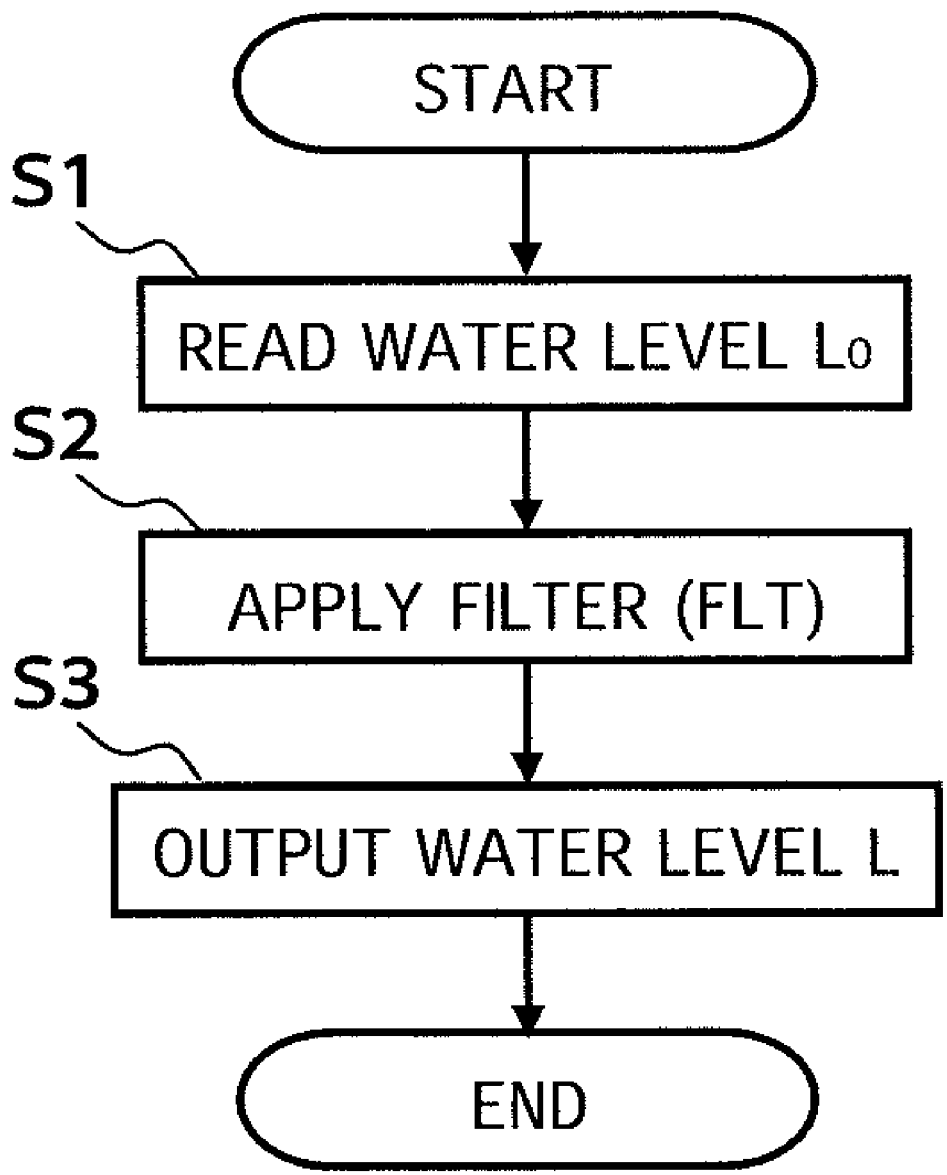
FIG. 2 is a flowchart indicating a control program according to a first embodiment.

FIG. 2 shows a first embodiment of a control program that is executed repeatedly for each predetermined time period, by the reducing-agent dosing ECU 36.

In step 1 (abbreviated to "S1" in the figure, and similarly hereunder), the water level L0 is read from the water level indicator 32.

In step 2, a filter value FLT is calculated by applying a filter with a time constant greater than one second (for example, several hundreds of seconds) to the water level L0.

In step 3, the filter value FLT is output as the final water level L.

Figure 3:
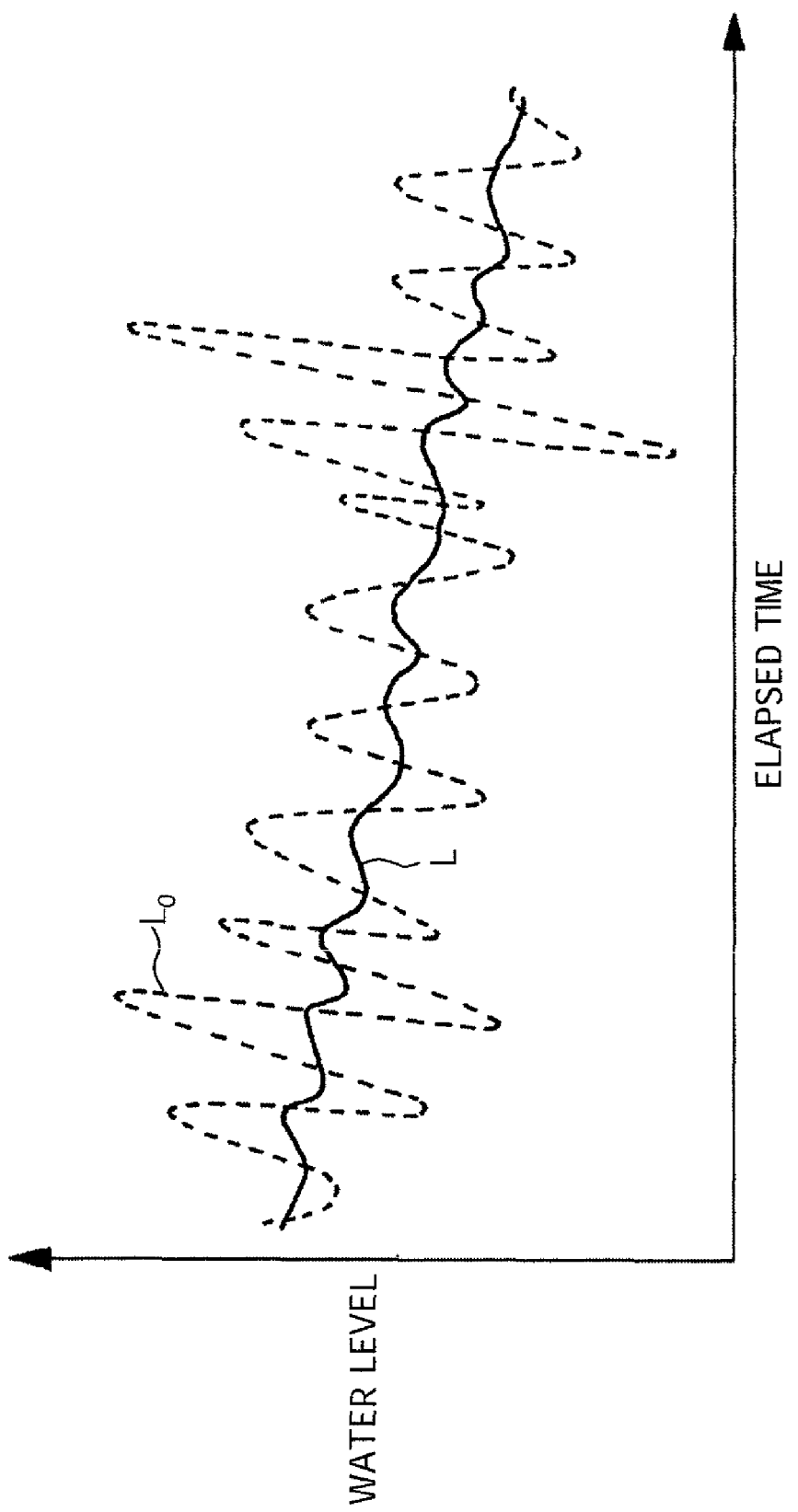
FIG. 3 is an explanatory drawing of an effect when applying a filter to a measured water level.

According to such a water level measuring apparatus, the filter value FLT obtained by applying the filter with a time constant greater than one second to the water level L0 measured by the water level indicator 32, is output as the final water level L. Therefore, as shown in FIG. 3, even if the surface of the urea aqueous solution sloshes so that the water level L0 fluctuates up and down, the fluctuation is smoothed by the filter. Hence there is little influence of the liquid sloshing, and the water level measurement accuracy can be improved.

Figure 4:
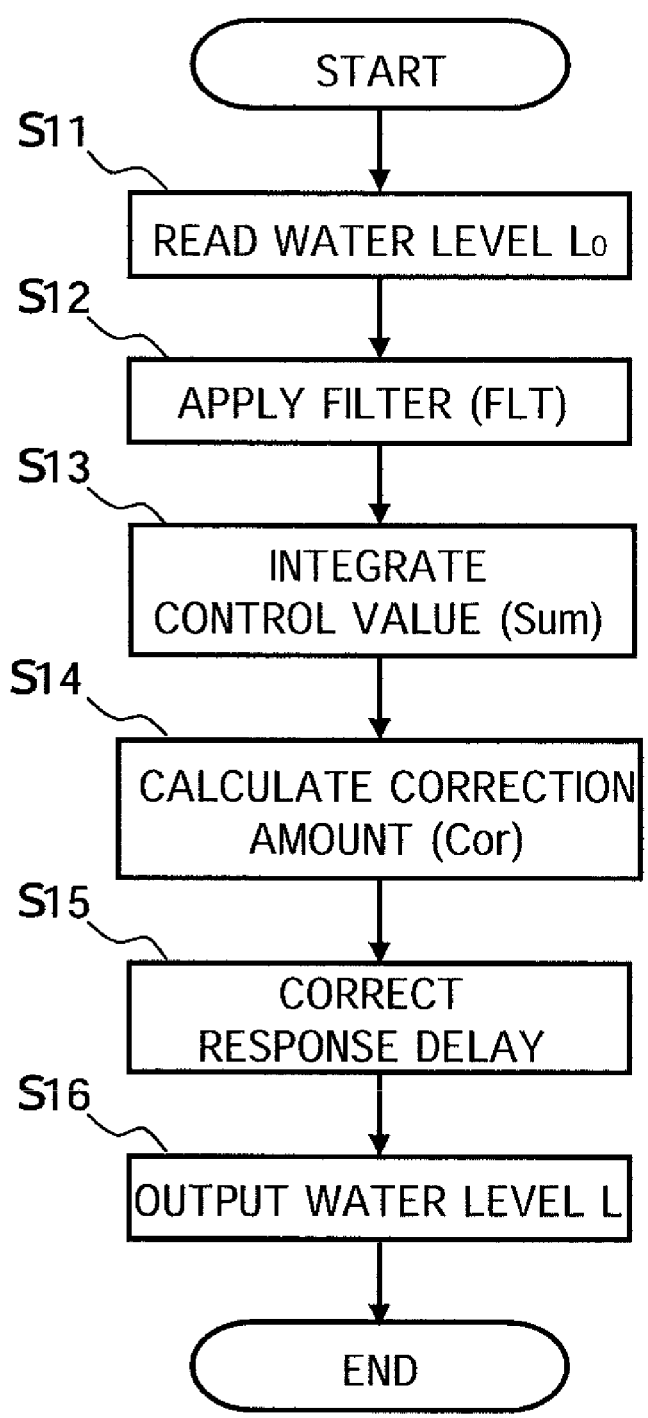
FIG. 4 is a flowchart indicating a control program according to a second embodiment.

FIG. 4 shows a second embodiment of a control program that is executed repeatedly for each predetermined time period, by the reducing-agent dosing ECU 36.

In step 11, the water level L0 is read from the water level indicator 32.

In step 12, a filter value FLT is calculated by applying a filter with a time constant greater than one second (for example, several hundreds of seconds) to the water level L0.

In step 13, a control value representing the injection flow rate of the urea aqueous solution is sequentially integrated according to an equation of "Integrated amount Sum =integrated amount Sum+control value".

In step 14, considering that the filter value FLT may include an error caused by a response delay, a correction amount Cor for correcting this is calculated. Specifically, a filter with a time constant greater than one second (for example, several hundreds of seconds) is applied to a moving average of a predetermined number of control values so as to correct the response delay based on a time series variation characteristic (inclination) of the integrated amount Sum, to thereby calculate the correction amount Cor.

In step 15, the response delay of the filter value FLT is corrected by adding the correction amount Cor to the filter value FLT.

In step 16, the filter value FLT of which the response delay has been corrected is output as the final water level L.

Figure 5:
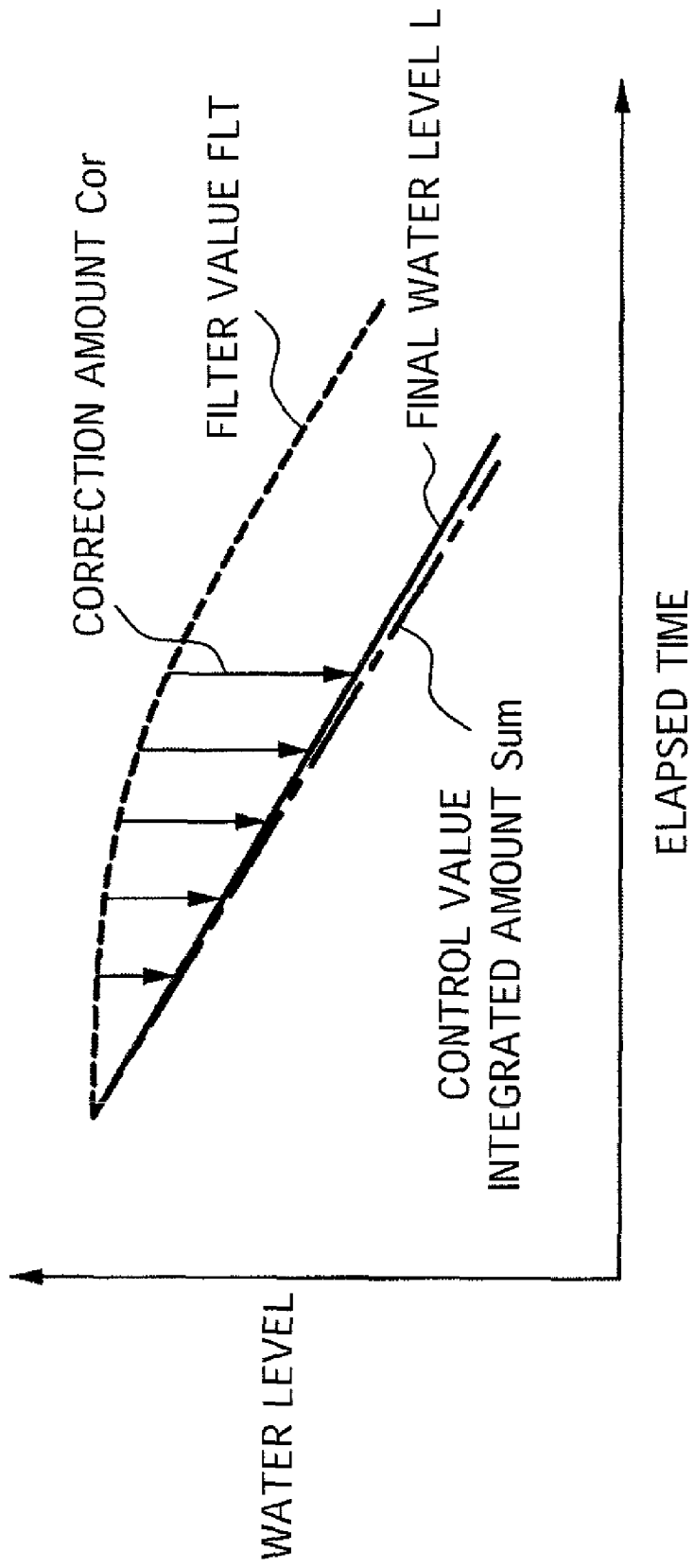
FIG. 5 is an explanatory drawing of a corrective effect.

According to such a water level measuring apparatus, in addition to the operation and effect in the previous first embodiment, the response delay which may be caused due to applying the filter to the water level L0, can be corrected. That is to say, as shown in FIG. 5, by adding the correction amount Cor to the filter value FLT, the water level L to be finally output approaches the integrated amount Sum obtained by integrating the control values, and the water level measuring accuracy can be further improved. At this time, the correction amount Cor is calculated by applying the filter with a time constant greater than one second to the moving average of the predetermined number of control values. Therefore, a complicated calculation is not required, so that an increase of the control load can be suppressed.

Incidentally, the present invention is not limited to the exhaust emission purifying device, and is also applicable to measurement of, for example, the water level of fuel stored in a fuel tank, and the water level of a chemical used in a chemical processing plant. In these cases, the control program can be executed by a computer or various control units having the computer built therein, instead of by the reducing-agent dosing ECU 36.

Moreover, the calculation applying the filter with a time constant greater than one second to the water level L0 can be performed not only by software processing by the control program, but also by hardware processing using a known electronic circuit including an RC circuit, an RL circuit, and the like.

It should be understood that many modifications and variations of the described embodiments of the invention will occur to a person having an ordinary skill in the art without departing from the spirit and scope of the present invention as claimed in the appended claims.

What is claimed is:

1. A water level measuring apparatus, comprising:
a water level indicator to measure a water level of a liquid stored in a liquid tank; and
a computer or a control unit including a computer, coupled to the water level indicator, to calculate a filter value by applying a filter with a time constant greater than one second to the water level measured by the water level indicator, and to output the filter value as a water level, wherein the computer or the control unit calculates an integrated amount by sequentially integrating a control value output to a flow control valve that controls a supply flow rate of the liquid stored in the liquid tank, calculates a correction amount for correcting a response delay of the filter value based on a time series variation characteristic of the integrated amount, and executes response delay correction processing for correcting the response delay of the filter value based on the correction amount.

2. A water level measuring apparatus according to claim 1, wherein, in the response delay correction processing, the correction value is calculated by applying a filter with a time constant greater than one second to a moving average of the control value.

* * * * *